(12) United States Patent
Suzuki et al.

(10) Patent No.: US 7,165,664 B2
(45) Date of Patent: Jan. 23, 2007

(54) WET-TYPE SEGMENTED FRICTION MATERIAL AND ITS MANUFACTURING METHOD

(75) Inventors: Masato Suzuki, Toyota (JP); Yoshihito Fujimaki, Aichi-ken (JP); Masayuki Mizuno, Seto (JP); Hideto Nakagawa, Aichi-ken (JP)

(73) Assignee: Aisin Kako Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/644,067

(22) Filed: Aug. 20, 2003

(65) Prior Publication Data
US 2004/0074733 A1 Apr. 22, 2004

(30) Foreign Application Priority Data
Aug. 21, 2002 (JP) ............................. 2002-240515
Oct. 28, 2002 (JP) ............................. 2002-312870

(51) Int. Cl.
*F16D 13/72* (2006.01)

(52) U.S. Cl. ............................. 192/70.12; 192/70.14; 192/107 R; 192/113.36

(58) Field of Classification Search ............ 192/107 R, 192/113.36, 70.12, 70.14
See application file for complete search history.

(56) References Cited

U.S. PATENT DOCUMENTS

| 4,287,978 | A | * | 9/1981 | Staub, Jr. ............... 192/113.36 |
| 5,094,331 | A | | 3/1992 | Fujimoto et al. |
| 5,660,259 | A | * | 8/1997 | Peng et al. ............ 192/113.36 |
| 5,776,288 | A | * | 7/1998 | Stefanutti et al. ........... 156/263 |
| 5,975,260 | A | * | 11/1999 | Fischer et al. ............. 192/3.29 |
| 5,979,621 | A | * | 11/1999 | Schoder ..................... 192/3.29 |
| 6,170,629 | B1 | * | 1/2001 | Suzuki et al. ........... 192/107 R |
| 6,655,519 | B1 | * | 12/2003 | Wakamori ............. 192/113.36 |
| 6,675,942 | B1 | * | 1/2004 | Suzuki ...................... 192/3.29 |
| 6,712,190 | B1 | * | 3/2004 | Kitaori et al. ......... 192/113.36 |

FOREIGN PATENT DOCUMENTS

JP        4-194422        7/1992

\* cited by examiner

*Primary Examiner*—Saul Rodriguez
(74) *Attorney, Agent, or Firm*—Westerman, Hattori, Daniels & Andrian, LLP.

(57) ABSTRACT

A wet-type segmented friction material has a tape-like friction material substrate which is passed through and pressed between a roller having a dent at a center and a flat roller. At the same time, the friction material substrate is heated from an inside and an outside of the rollers so as to carry out a heat press compression processing. Then, a processed friction material substrate has a predetermined cross-section. The processed friction material substrate is cut into segment pieces each having a segment shape by a rotary push cutter having a sharp cutting edge. A cut position of the segment piece is selected such that two straight lines at two lateral sides of the segment shape is located within an area of a compressed portion of the processed friction material substrate. That is, a stepped or sunken compressed portion is provided on both sides of the segment piece.

9 Claims, 10 Drawing Sheets

WET-TYPE SEGMENTED FRICTION MATERIAL AND ITS MANUFACTURING METHOD

BACKGROUND OF THE INVENTION

1. Field of the Invention

This invention relates to a wet-type segmented friction material that has opposite surfaces applied with a high pressure to generate torque while immersed in an oil. Such friction material may be made by joining by adhesion segment pieces made of a friction material substrate that was cut into a segment shape onto one or both of opposite surfaces of a core metal of a flat ring shape along a circumference thereof with an adhesion.

2. Description of the Related Art

As a recent wet-type friction material, a technique shown in FIG. 20 is under development in order to improve yield with resultant cost reduction and to lessen drag torque with resultant high fuel efficiency. FIG. 20 illustrates a plan view of an overall structure of a conventional segmented friction material. As shown in FIG. 20, the segmented friction material 221 has a core metal 222 of a flat ring shape and friction material substrates 223. The friction material substrates 223 are made by cutting a friction material blank into a segment piece shape. A set of such segment-shaped substrates 223 are arranged and joined with an adhesive onto a front surface of the core metal 222 side by side along a circumference of the core metal 222 with a gap to be an oil groove 224 formed therebetween. Another set of the segment-shaped substrates 223 are joined with the adhesive to a rear surface of the core metal 222, too. Such segmented friction material 221 is applicable to a friction material clutch device that has a single or plural friction plates and that is used in an automatic transmission of automobiles or motorcycles or the like. Such technique corresponds to a technique described in Japanese Laid Open Patent Publication No. 4-194422 or U.S. Pat. No. 5,094,331.

However, the conventional wet-type segmented friction material has drawbacks as follows. There are produced fuzz or scuffing at a cut surface of the substrates 223 when the friction material substrates 223 are cut off to become the segmented pieces. Then, the drag torque increases because the fuzz is generated to a large degree. Moreover, since the fuzz is generated to a large degree, strength of the segment piece or the substrate 223 decreases at the cut surface, thereby causing exfoliation of layers generated from the cut surface.

Moreover, an area around the oil groove 224 of the segmented friction material 221 is formed of the cut surface of the segment pieces 223. Therefore, there is a problem that a wall portion at the oil groove of the friction material 221 is vulnerable to exfoliation when it is applied with a load such as a shear torque by ATF (automatic transmission fluid) at an idle running time as compared with a friction material having a pressed oil groove that is a present mainstream.

BRIEF SUMMARY OF THE INVENTION

An object of the present invention is to provide a wet-type segmented friction material and its manufacturing method that restrains fuzz and improves strength at a cut surface so as to solve a problem of increase of drag torque and generation of layer exfoliation from the cut surface, thereby performing excellent friction property.

Another object of the present invention is to provide a wet-type segmented friction material that curbs oil pressure applied to an outer peripheral portion of an oil groove part so as to improve anti-exfoliation property to a large degree.

According to a first aspect of the invention, there is provided a manufacturing method of a wet-type segmented friction material that has a core metal of a flat ring shape and a friction material substrate cut into a segment shape along the flat ring shape of the core metal. The manufacturing method comprises the steps of processing an area around a cut portion corresponding to the segment shape of the friction material substrate with a heat press compression forming; cutting the cut portion of the friction material substrate into the segment shape after said processing step, thereby preparing segment pieces each having the segment shape; and joining by adhesion the segment pieces on one or both surfaces of the core metal along the flat ring shape.

The processing step with the heat press compression forming may be carried out on only two sides as two straight lines of the cut portion of the segment shape of the friction material substrate.

The processing step with the heat press compression forming may be carried out on all four sides of the cut portion of the segment shape of the friction material substrate.

The processing step with the heat press compression forming may be carried out under a heating temperature of about 100° C. to about 350° C.

The processing step with the heat press compression forming may be carried out so that a thickness of the friction material substrate after the heat press compression forming becomes within a range of about 20% to about 95% of a thickness of the friction material substrate in the wet-type segmented friction material as a finished product.

The processing step with the heat press compression forming may be carried out so that a thickness of the friction material substrate after the heat press compression forming becomes substantially the same as a thickness of the friction material substrate in the wet-type segmented friction material as a finished product.

The processing step with the heat press compression forming may be carried out so that a width of a compressed portion of the friction material substrate after the heat press compression forming becomes about 0.1 mm to about 2.0 mm when the friction material substrate is cut into the segment shape.

According to a second aspect of the invention, there is provided a wet-type segmented friction material comprising: a core metal of a flat ring shape: and a friction material substrate cut into a segment shape along the flat ring shape of the core metal, thereby preparing segment pieces each having the segment shape. The segment pieces are joined by adhesion on one or both surfaces of the core metal along the flat ring shape. An area around a cut portion corresponding to the segment shape of the friction material substrate is pressed and compressed at two side as two straight lines of the cut portion or at all four sides of the cut portion when the friction material substrate is cut into the segment shape.

According to a second aspect of the invention, there is provided a wet-type segmented friction material comprising: a core metal of a flat ring shape: and a friction material substrate cut into a segment shape along the flat ring shape of the core metal, thereby preparing segment pieces each having the segment shape. The segment pieces are joined by adhesion on one or both surfaces of the core metal along the flat ring shape. A gap as an oil groove is formed between adjacent segment pieces joined on the surface of the core metal. A width at an outer peripheral opening of the gap is larger than a width at an inner peripheral opening of the gap.

The width at the outer peripheral opening of the gap may be about one and a half times as large as the width at the inner peripheral opening of the gap.

The width at the outer peripheral opening of the gap may be about twice to about three times as large as the width at the inner peripheral opening of the gap.

The segment piece may have a round shape formed at each of four corners.

The segment piece may have a chamfered shape formed at each of four corners.

The gap as the oil groove between the adjacent segment pieces may have substantiate a V-shape.

Further objects and advantages of the invention will be apparent from the following description, reference being had to the accompanying drawings, wherein preferred embodiments of the invention are clearly shown.

DETAILED DESCRIPTION OF THE INVENTION

Figure 1:
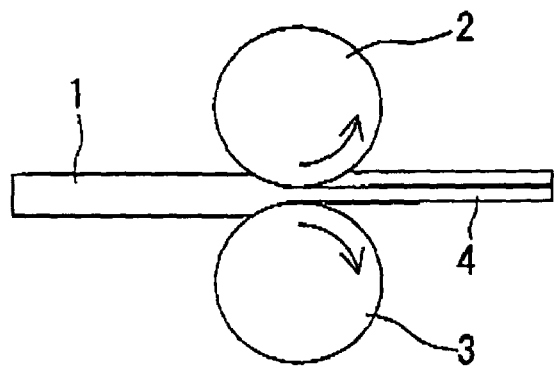
FIG. 1 is a side view showing a heat press compression processing by a roller for a friction material substrate in a manufacturing method of a wet-type segmented friction material according to a first embodiment of the invention.

Several embodiments of the invention are described hereunder referring to the attached drawings. The same reference character is used to show the same element throughout the several embodiments.

First Embodiment

Figure 2:
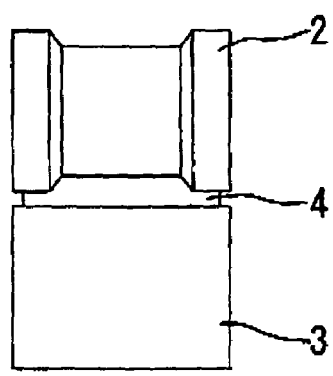
FIG. 2 is a front view showing the heat press compression processing by the roller for the friction material substrate in the manufacturing method of the wet-type segmented friction material according to the first embodiment of the invention.
Figure 3:
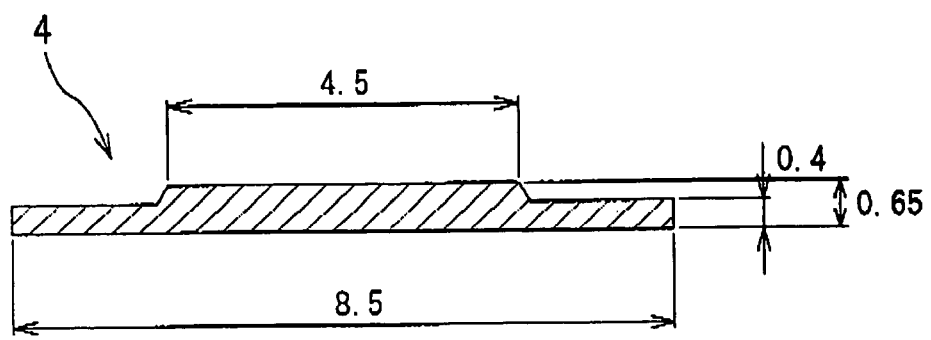
FIG. 3 is a cross-sectional view showing a cross-section of the wet-type segmented friction material obtained by the heat press compression processing by the roller for the friction material substrate in the manufacturing method according to the first embodiment of the invention.
Figure 4:
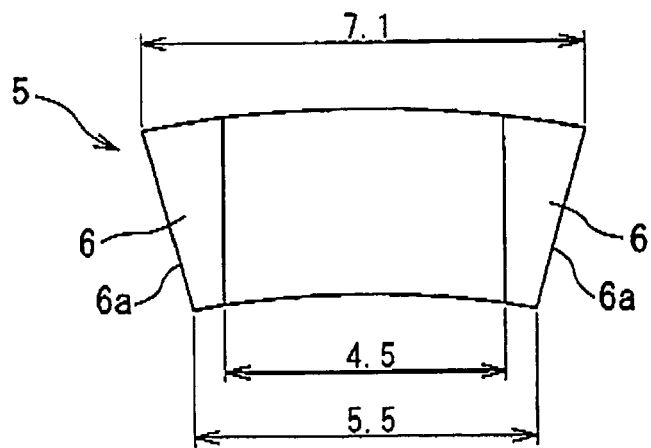
FIG. 4 is a plan view showing the friction material substrate cut off into a segment shape in the manufacturing method of the wet-type segmented friction material according to the first embodiment of the invention.
Figure 5:
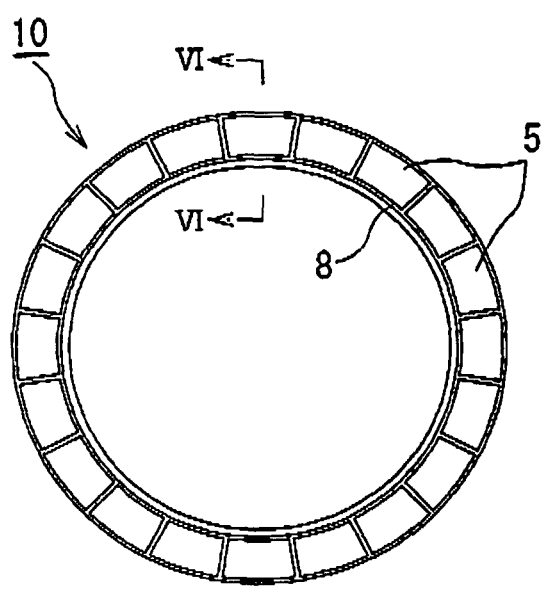
FIG. 5 is a plan view showing the wet-type segmented friction material as a finished product according to the first embodiment of the invention.
Figure 6:
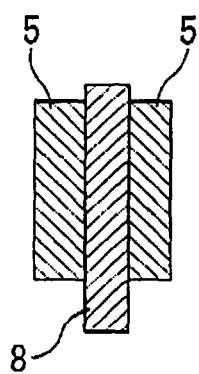
FIG. 6 is a cross-sectional view taken along the line VI—VI of FIG. 5.

A first embodiment of a wet-type segmented friction material is described hereafter referring to FIGS. 1 to 6. FIG. 1 is a side view showing a heat press compression processing by a roller for a friction material substrate in a manufacturing method of a wet-type segmented friction material according to a first embodiment of the invention. FIG. 2 is a front view showing the heat press compression processing by the roller for the friction material substrate in the manufacturing method of the wet-type segmented friction material according to the first embodiment of the invention. FIG. 3 is a cross-sectional view showing a cross-section of the wet-type segmented friction material obtained by the heat press compression processing by the roller for the friction material substrate in the manufacturing method according to the first embodiment of the invention. FIG. 4 is a plan view showing the friction material substrate cut off into a segment shape in the manufacturing method of the wet-type segmented friction material according to the first embodiment of the invention. FIG. 5 is a plan view showing the wet-type segmented friction material as a finished product according to the first embodiment of the invention. FIG. 6 is a cross-sectional view taken along the line VI—VI of FIG. 5.

First of all, a heat press compression processing by a roller is described in the manufacturing method of the first embodiment of the wet-type segmented friction material, referring to FIGS. 1 to 3. As shown in FIG. 1, a tape-like friction material substrate 1 was continuously fed and pressed through between a stepped roller 2 having a dent at a center and a flat roller 3. At the same time, the friction material substrate 1 was heated from an inside and an outside of the rollers 2 and 3 so as to carry out a heat press compression processing or forming. The heating temperature of the rollers 2 and 3 was 250° C. A feeding speed of the friction material substrate 1 was 4 m/min.

As a result, a processed friction material substrate 4 was obtained that had a cross-section and a dimension as shown in FIG. 3.

Next, as shown in FIG. 4, the processed friction material substrate 4 was cut off by use of a rotary push cutter or push cutting die having a sharp cutting edge into segment pieces 5 or segment-shaped friction material substrates. As well seen if compared with the dimension shown in FIG. 3, a cutting position of the segment piece 5 was selected such that straight lines 6a at two sides at opposite lateral ends of the segment shape was located within a press compression part or a compressed portion of the processed friction material substrate 4. That is, opposite parts 6 of the segment piece 5 are made of the press compression part that is depressed or located one step lower.

As shown in FIG. 5, such obtained segment pieces 5 were arranged side by side with a gap of an oil groove provided therebetween and stuck on to a front surface of a core metal 8 of a flat ring plate shape or a flat ring shape by use of an adhesive or a thermosetting resin. The segment pieces 5 were stuck on to at rear surface of the core metal 8 by use of the adhesive, too. Then, the segment pieces 5 were pressed from opposite sides for 30 to 90 seconds by use of a heat press of 230 to 250° C. so as to be secured to the core metal 8, thereby obtaining a wet-type segmented friction material 10 as a finished product. At this time, a thickness of the segment piece 5 is 0.4mm at the press compression part and 0.45mm at the other part. That is, the thickness of the press compression part of the segment piece 5 is about 88% of the other part.

A friction characteristic of the first embodiment of the wet-type segmented friction material 10 will be described later on together with other embodiments.

Second Embodiment

Figure 7:
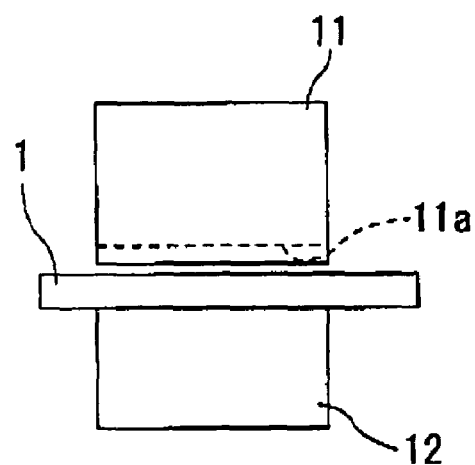
FIG. 7 is a side view showing a heat press compression processing by a heat forming mold for a friction material substrate in a manufacturing method of a wet-type segmented friction material according to a second embodiment of the invention.
Figure 8:
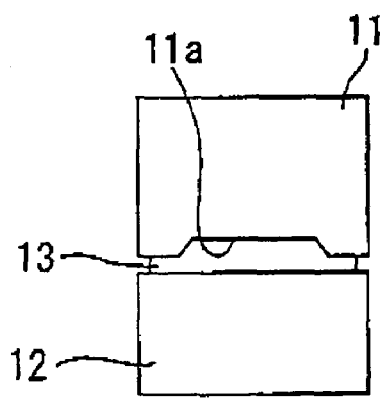
FIG. 8 is a front view showing the heat press compression processing by the heat forming mold for the friction material substrate in the manufacturing method of the wet-type segmented friction material according to the second embodiment of the invention.

A second embodiment of a wet-type segmented friction material is described hereafter referring to FIGS. 7 and 8. FIG. 7 is a side view showing a heat press compression processing by a heat forming mold for a friction material substrate in a manufacturing method of a wet-type segmented friction material according to a second embodiment of the invention. FIG. 8 is a front view showing the heat press compression processing by the heat forming mold for the friction material substrate in the manufacturing method of the wet-type segmented friction material according to the second embodiment of tile invention.

As shown in FIG. 7, a heat forming mold is composed of an upper mold 11 having a dent at a center of a lower surface and a lower mold 12 having a flat upper surface. The friction material substrate 1 like that of the first embodiment was placed on the lower mold 12, as shown in FIG. 7. Then, The friction material substrate 1 was compressed by heat forming by the upper mold 11, as shown in FIG. 8, thereby obtaining a processed friction material substrate 13 having a similar cross-section to that of the first embodiment. The heat forming was conducted under a condition of a heating temperature of 250° C. and a heating time of 3 seconds. Thus obtained processed friction material 13 was cut off into segment pieces such that a pressed and compressed part of each segment piece corresponded to a cut position of two straight sides of a segment shape.

Thereafter, in the same steps as those of the first embodiment, the segment pieces were stuck on to both surfaces of a core metal of a flat ring plate shape, thereby obtaining a wet-type segmented friction material. Consequently, the first and the second embodiments are different in the way of the heat press compression processing which is carried out by the heat rollers in the first embodiment, while carried out by the heat forming mold in the second embodiment.

Third Embodiment

Figure 9:
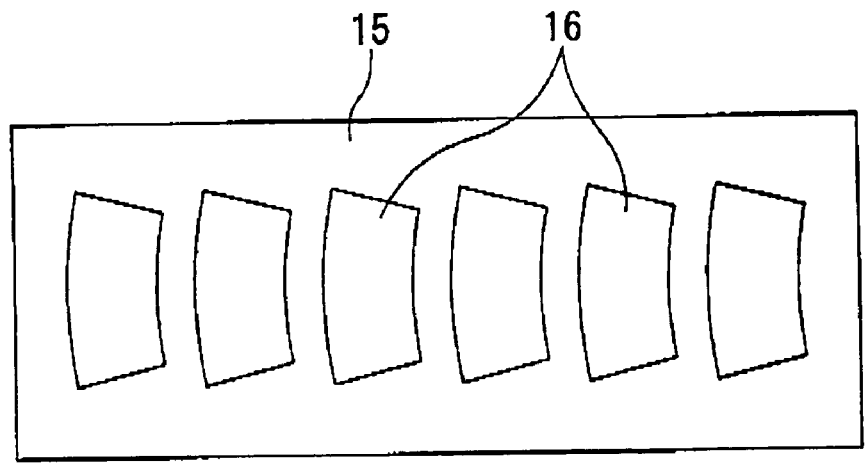
FIG. 9 is a plan view showing a friction material substrate processed with a heat press compression forming with a segment shape unprocessed in a manufacturing method of a wet-type segmented friction material according to a third embodiment of the invention.
Figure 10:
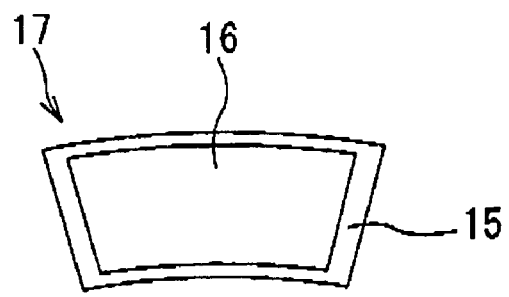
FIG. 10 is a plan view showing a segment piece cut off with four sides provided with a press compression part in the manufacturing method of the wet-type segmented friction material according to the third embodiment of the invention.

A third embodiment of a wet-type segmented friction material is described hereafter referring to FIGS. 9 and 10. FIG. 9 is a plan view showing a friction material substrate processed with a heat press compression forming with a segment shape unprocessed in a manufacturing method of a wet-type segmented friction material according to a third embodiment of the invention. FIG. 10 is a plan view showing a segment piece cut off with four sides provided with a press compression part in the manufacturing method of the wet-type segmented friction material according to the third embodiment of the invention.

As shown in FIG. 9, in the third embodiment, a press compression part 15 is provided at a circumference of a friction material substrate. Segment shapes are kept from pressing as an uncompressed part 16 successively at a fixed interval at a center of the friction material substrate. Each of the segment shapes has an outline one size smaller than an outline of a segment piece 17 as a cut-off friction material substrate. A heat press compression processing for such forming can be performed by a pair of heat rollers one of which has plural dents of a segment shape provided at the fixed interval of the segment shapes on a peripheral surface. Alternatively, the heat press compression processing for such forming may be performed by a heat forming mold composed of an upper and a lower molds one of which has plural dents of a segment shape provided at the fixed interval of the segment shapes on a press surface. A plate thickness of a press compression part 15 is 0.36 mm.

Next, the compressed friction material substrate was cut off along a circumference of the uncompressed part 16 by use of a rotary push cutter into segment pieces 17 or segment-shaped friction material substrates. Each of the segment pieces 17 has the outline one size larger than the outline of the uncompressed part 16. The segment piece 17 is characterized in that the press compression part 15 is provided at all four sides, thereby reinforcing it at the four sides.

Thereafter, in the same steps as those of the first embodiment, the segment pieces 17 were stuck on to both surfaces of a core metal of a flat plate shape, thereby obtaining a wet-type segmented friction material. The press compression part 15 of the wet-type segmented friction material as a finished product had a plate thickness of about 80% as large as a thickness of the other part.

Fourth Embodiment

A fourth embodiment of a wet-type segmented friction material is described hereafter. The fourth embodiment of a manufacturing method of the wet-type segmented friction material is generally the same as that of the first embodiment. In contrast, the fourth embodiment is different in that it controls a press compression force by the heat rollers and a pressing force at the time of securing the segment pieces on the core metal so as to equalize the thickness of the press compression part at both ends of the segment piece and the thickness of the other part in the wet-type segmented friction material as the finished product. In the fourth embodiment, the segment piece was secured to the core metal under a condition of a heating temperature of 230° C. and a heating time of 90 seconds, thereby obtaining a wet-type segmented friction material as a finished product. At this time, a press compression part at opposite ends of the segment piece was equalized in thickness with the other part. Consequently, the segment piece became flat over its entire surface.

Evaluation and Test Results

Figure 11:
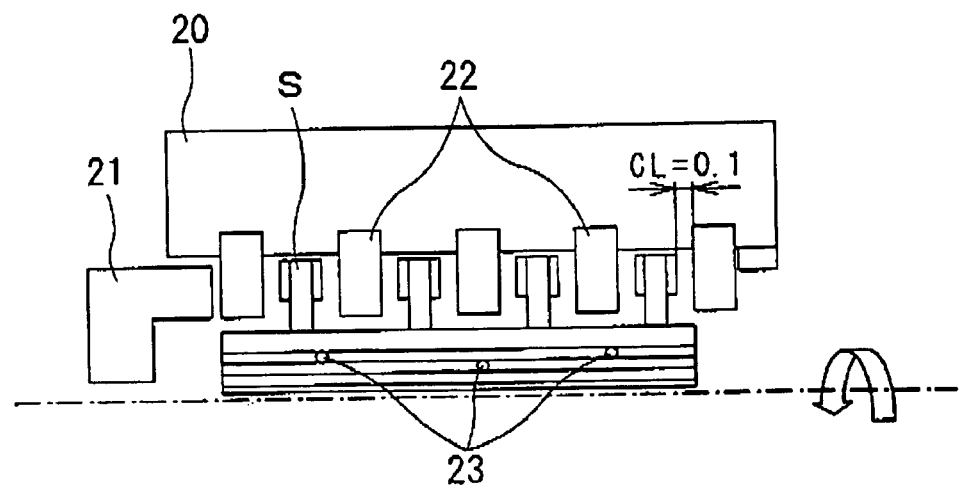
FIG. 11 is a schematic view showing a diagram of a system used for evaluation of a drag characteristic of the wet-type segmented friction material according to the first to fourth embodiments of the invention.
Figure 12:
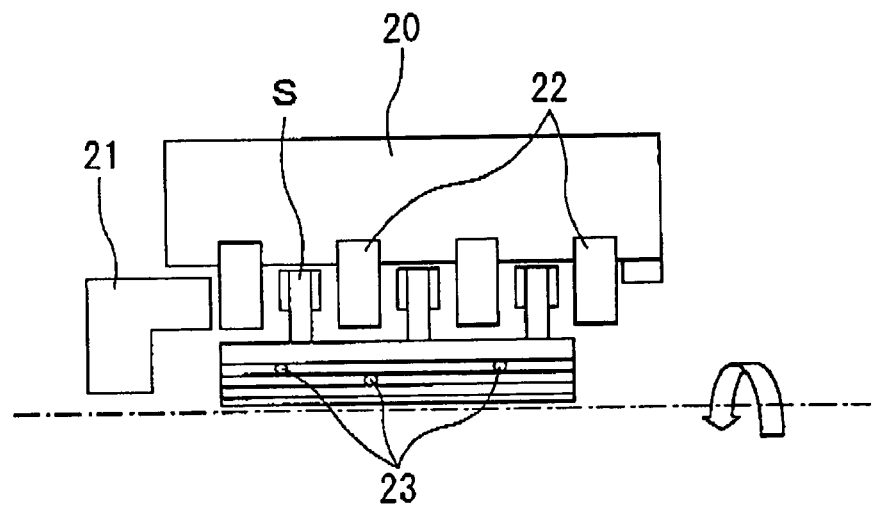
FIG. 12 is a schematic view showing a diagram of a system used for evaluation of an exfoliation durability characteristic of the wet-type segmented friction material according to the first to fourth embodiments of the invention.
Figure 13:
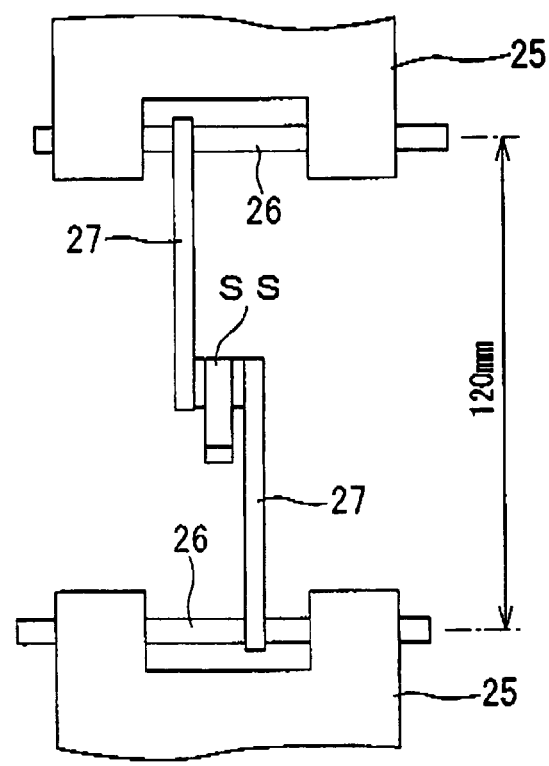
FIG. 13 is a schematic view showing a diagram of a system used for a tensile shear test of the wet-type segmented friction material according to the first to fourth embodiments of the invention.

A drag characteristic evaluation test, an anti-exfoliation characteristic evaluation test and a tensile shear test were conducted on the first to the fourth embodiments of the wet-type segmented friction materials, while comparing them with comparison examples. Each of the tests is schematically described referring to FIGS. 11 to 13. FIG. 11 is a schematic view showing a diagram of a system used for evaluation of a drag characteristic of the wet-type segmented friction material according to the first to fourth embodiments of the invention. FIG. 12 is a schematic view showing a diagram of a system used for evaluation of an exfoliation durability characteristic of the wet-type segmented friction material according to the first to fourth embodiments of the invention. FIG. 13 is a schematic view showing a diagram of a system used for a tensile shear test of the wet-type segmented friction material according to the first to fourth embodiments of the invention.

First of all, an overview is given with respect to the drag torque evaluation test referring to FIG. 11. A SAE#2 tester 20 was used as a tester. Four wet-type augmented friction materials S as a test specimen were disposed between five plates 22, respectively. A clearance CL of 0.1 mm was maintained between each surface of the friction material S and a surface of the tester facing thereto. The wet-type segmented friction material S has the following size: an outer diameter of 120 mm, an inner diameter of 106 mm and an even width of the oil groove of 2 mm. A number of the segment pieces for each surface of the friction material S is twenty. The drag torque was measured while holding the outermost plate 22 by a piston 21 and letting ATF (automatic transmission fluid) of an oil temperature of 40° C. flow as a lubricating oil through lubricating oil holes 23 in a lubricating oil amount of 500 ml/min at a friction rotation speed of 1000 rpm.

Next, an overview is given with respect to the anti-exfoliation evaluation test referring to FIG. 12. A SAE#2 tester 20 was used as a tester, as in the drag torque evaluation test. Three wet-type segmented friction materials S as a test specimen were disposed between four plates 22, respectively. A clearance CL of 0.8 mm was maintained between each surface of the friction material S and a surface of the tester facing thereto. The wet-type segmented friction material S has the following size: an outer diameter of 120 mm, an inner diameter of 106 mm and an even width of the oil groove of 2 mm. A number of the segment pieces for each surface of the friction material S is twenty. The anti-exfoliation evaluation test was conducted while letting ATF of an oil temperature of 120° C. flow as a lubricating oil through the lubricating oil holes 23 in a lubricating oil amount of full dip state. An anti-exfoliation duration time or exfoliation durability time was measured under a condition that a proportion between an ON state and an OFF state became ON/OFF=60 min/1 min at a friction revolution speed of 6000 rpm. The four plates 22 and the three wet-type segmented friction materials 3 were pressed by the piston 21 in the ON state, while a clearance was maintained therebetween in the OFF state.

Next, an overview is given with respect to the tensile shear strength measurement test referring to FIG. 13. A tensile shear testing machine having a maximum power of 4.9 kN or more was used. As shown in FIG. 13, a front end of a test piece 27 was stuck by an adhesive on each of opposite surfaces of a test specimen SS got by cutting off a ring-shaped wet-type segmented friction material. Then, a supporting rod 26 attached to a chucking jig 25 is inserted through a not-shown hole provided at a rear end of the test piece 27 to support the test piece 27. A shear strength was measured in such state.

Figure 14:
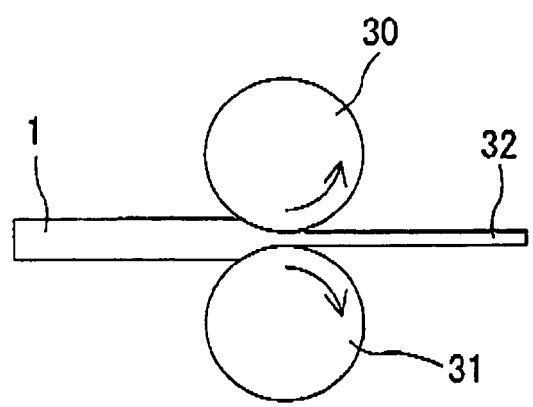
FIG. 14 is a side view showing a manufacturing method of a wet-type segmented friction material according to a second comparison example.
Figure 15:
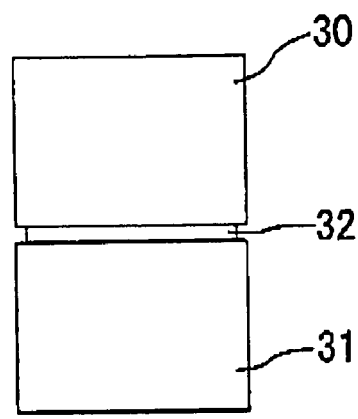
FIG. 15 is a front view showing the manufacturing method of the wet-type segmented friction material according to the second comparison example.

Next, a manufacturing method of the comparison examples is described referring to FIGS. 14 and 15. FIG. 14 is a side view showing a manufacturing method of a wet-type segmented friction material according to a second comparison example. FIG. 15 is a front view showing the manufacturing method of the wet-type segmented friction material according to the second comparison example.

FIRST COMPARISON EXAMPLE

As compared with the first embodiment, in a wet-type segmented friction material as a first comparison example, a friction material substrate was not processed by the heat roller press of FIG. 1 in a first step. In the rest of steps, the first comparison example was manufactured in the same way as the first embodiment. That is, the first comparison example corresponds to a conventional wet-type segmented friction material.

SECOND COMPARISON EXAMPLE

As compared with the first embodiment, in a wet-type segmented friction material as a second comparison example, a friction material substrate was processed by a heat roller press in a first step to have a flat surfaces as shown in FIG. 11. A plate thickness of thus obtained friction material substrate was 3.5 mm or the same thickness as the thickness of the friction material substrate in a finished product. In the rest of steps, the second comparison example of the wet-type segmented friction material was manufactured in the same way as the first embodiment.

THIRD COMPARISON EXAMPLE

As compared with the third embodiment, in a wet-type segmented friction material as a third comparison example, a press compression part has a plate thickness of 0.25 mm, while the press compression part of the third embodiment has the plate thickness of 0.36 mm. In the rest of steps, the third comparison example of the wet-type segmented friction material was manufactured in the same way as the third embodiment.

The drag characteristic evaluation, the anti-exfoliation characteristic evaluation and the tensile shear strength test were carried out for the first to the fourth embodiments of the wet-type segmented frication material and the first to the third comparison examples that were manufactured as described above, respectively. The test results are shown in TABLE 1.

TABLE 1

| | Compression Rate Thickness of pressed part/Thickness of the other part | Pressed Side | Exfoliation Durability Time | Shear Strangth | Drag Torque |
|---|---|---|---|---|---|
| 1st Em. | 89% | Two lateral sides | 210 Hr | 2.1 MPa | 0.86 Nm |
| 2nd Em. | 89% | Two lateral sides | 220 Hr | 2.0 MPa | 0.88 Nm |
| 3rd Em. | 80% | All four sides | 220 Hr | 2.3 MPa | 0.86 Nm |
| 4th Em. | 100% | Two lateral sides | 190 Hr | 2.0 MPa | 0.90 Nm |
| 1st Ex. | 100% | None | 18 Hr | 1.1 MPa | 1.02 Nm |
| 2nd Ex. | 100% | None | 24 Hr | 1.3 MPa | 0.97 Nm |
| 3rd Ex. | 56% | All four sides | 12 Hr | 1.2 MPa | 0.89 Nm |

As shown in TABLE 1, the exfoliation durability time is about 200 hours in each of the first to the fourth embodiments. Such durability time of the inventive segmented friction material is about ten times as long as that of the first comparison example as prior art, about ten times as long as that of the second comparison example and about twenty times as long as that of the third comparison example. Thus, it was confirmed that the segmented friction material of each of the first to the fourth embodiments performs excellent anti-exfoliation characteristic. A reason of such result could be thought as follows. Since the cut-off portion of the segment piece was processed by the heat press compression forming before cutting, density at the cut portion augments. Then, fuzz or scuffing is restrained from generating at the cut surface at the time of cutting of the segment pieces. Consequently, strength increases at the cut surface so that exfoliation of layer is hard to be generated from the position of the cut surface.

In contrast, though the second comparison example of the segmented friction material has the segment piece processed by the heat press compression forming over its entire surface, the exfoliation durability time hardly increases. A reason of such result could be thought as follows. The compression force is dispersed over the entire surface of the segment piece. Consequently, the density at the cut portion hardly increases. Moreover, though the third comparison example of the segmented friction material has the segment piece processed by the heat press compression forming at the cut portion, the anti-exfoliation characteristic became worse. A reason of such result could be thought as follows. The compression force is excessively high at the cut portion. Consequently, compression failure is generated on a structure of the friction material at the pressed portion.

The shear strength is 2 MPa or more in each of the first to the fourth embodiments and about twice as large as that of the first comparison example as prior art. Thus, the shear strength characteristic is very much improved. Particularly, the third embodiment of the segmented friction material that has th four sides of the segment piece processed by the heat press compression forming shows the largest shear strength of 2.3 MPa, A reason of the improvement of the shear strength could be thought as follows. Since the cut-off portion of the segment piece was processed by the heat press compression forming before cutting, density at the cut portion augments. Then, fuzz or scuffing is restrained from generating at the cut surface at the time of cutting of the segment pieces. Consequently, strength increases at the cut surface. In contrast, the shear strength hardly improves in the second and the third comparison examples, The drag torque in each of the first to the fourth embodiments is smaller than the first comparison example as prior art and thus improved. A reason of the improvement of the shear strength could be thought as follows. Since the cut-off portion of the segment piece was processed by the heat press compression forming before cutting, density at the cut portion augments. Then, the fuzz or scuffing is restrained from generating at the cut surface at the time of cutting of the segment pieces. Consequently, the drag torque is restrained from increase, which is caused if the fuzz or scuffing is generated to a large amount.

With respect to the drag torque, though the second comparison example is nearly the same as the first comparison example, the third comparison example is improved. A reason of the improvement of the shear strength could be thought as follows. Since the cut-off portion of the segment piece was processed by the heat press compression forming before cutting, density at the cut portion augments, though the pressure is excessively high. Then, the fuzz or scuffing is restrained from generating at the cut surface at the time of cutting of the segment pieces.

As mentioned above, each of the first to the fourth embodiments provides the manufacturing method of the wet-type segmented friction material that restrains the fuzz and improves strength at the cut surface so as to solve the problem of increase of drag torque and generation of layer exfoliation from the cut surface, thereby performing excellent friction property.

Moreover, as an advantageous effect inherent in each of the above embodiments, since the tape-like friction material substrate is used, it is possible to continuously process the segment pieces.

While each of the above embodiments uses the tape-like friction material substrate, it is possible to use a sheet-like friction material substrate. Moreover, the size of the friction material as the finished product mentioned above is just an example. The size of the wet-type segmented friction material changes depending on it use or the like.

The cross-sectional shape of the press compression part may be any shape such as a stepped one, a tapered one or a curved one.

The invention is not limited to the above first to the fourth embodiments with respect to the other structure, shape, number, material, size, connection or the like of the wet-type segmented friction material as well as to the other steps of the manufacturing method of the wet-type segmented friction material.

Each of the above embodiments was described as an example in which the friction material substrate 5, 17 are cut into the segment shape along the flat ring shape of the core metal 8 and joined by adhesion to the opposite surfaces of the core metal 8 along the full circumference. However, in practicing the invention, the friction material substrate 5, 17 may be joined by adhesion to one of the opposite surfaces of the core metal 8 along the full circumference.

Advantageous Effects

Advantageous effects of the invention that is concretized into the first to the fourth embodiments are described hereunder.

The manufacturing method of the wet-type segmented friction material of the invention processes the peripheral part or an area around the cut portion of the friction material substrate by the heat press compression forming before cutting.

Then, such part of the friction material substrate that is given high density and improved strength by the heat press compression forming is cut off into the segment shape. Thus, the fuzz at the cut surface is kept from generating and the strength is free from weakening. Consequently, the layer exfoliation of the friction material substrate is prevented from generating from the cut surface. As described above, the friction material substrate has the part to be the cut surface processed beforehand by the heat press compression forming, so that it becomes highly dense and very strong. As a result, the fuzz or scuffing at the time of the cutting is prevented.

Then, the fuzz is restrained and the strength is improved at the cut surface so as to solve the problem due to increase of the drag torque and generation of layer exfoliation from the cut surface. Thus, it is possible to provide the inventive manufacturing method of the wet-type segmented friction material that performs excellent friction property. Moreover, since the cut portion of the friction material substrate is compressed, the area of the cut surface decreases. Consequently, another advantage is obtained such that life of a cutting member such as the cutting roller can be longer.

In addition, in the manufacturing method of the wet-type segmented friction material of the invention, the heat press compression processing may be performed on the peripheral part of only two straight sides among the four sides of the cut portion of the friction material substrate.

That is, the heat press compression processing is performed beforehand on the peripheral portion only at the facing two straight lines or two lateral sides of the segment piece of a sector shape, thereby giving that portion high density and high strength. On the other hand, the inner edge and the outer edge of the sector shape is not processed by the heat press compression forming. Then, after the segment pieces are joined to the core metal by the adhesive, there are formed a gap to be an oil groove between the straight lines or the lateral sides of the adjacent two segments. Therefore, when the wet-type segmented friction material is used or operated, a large oil pressure is applied to the cut surface of the straight line or the lateral side, so that the friction material substrate is easy to be fuzzed at around such cut surface and the layer exfoliation is easy to occur. Therefore, the inventive segmented friction material reinforces only the cut surfaces of the lateral two straight sides so as to sufficiently prevent the fuzz, the increase of the drag torque and the layer exfoliation while simplifying the manufacturing steps.

In this case, the fuzz is restrained and the strength is improved at the cut surface, to which the large oil pressure is applied, so as to solve the problem due to increase of the drag torque and generation of layer exfoliation from the cut surface. Consequently, it is possible to provide the inventive manufacturing method that performs excellent friction property.

In addition, in the manufacturing method of the wet-type segmented friction material of the invention, the heat press compression processing may be performed on the peripheral part of all the four sides of the cut portion of the friction material segment.

As mentioned above, sufficient effects are obtained if the cut surfaces of the two sides are reinforced since the large oil pressure is applied thereto. Still, the oil pressure is also applied to the cut surfaces of the other two sides at the inner periphery and the outer periphery. Therefore, all the four sides of the segment shape are compressed and reinforced so that the cut surfaces are reinforced at all the four sides, for the purpose of completely preventing the fuzz, the increase of the drag torque and the layer exfoliation, thereby making assurance doubly sure.

In this case, the fuzz is restrained and the strength is improved at the cut surfaces of all the four sides of the segment shape so as to solve the problem due to increase of the drag torque and generation of layer exfoliation from the cut surface. Consequently, it is possible to provide the inventive manufacturing method that performs excellent friction property.

In addition, in the manufacturing method of the wet-type segmented friction material of the invention, the heating temperature of the heat press compression processing may be about 100 to 350° C.

In view of components of the friction material substrate, the heating temperature is preferably within the range of about 100 to 350° C. in order to expect improvement of the strength of the structure. If the heat press compression processing is carried out within such range of the heating temperature, it is possible to improve the strength of the friction material substrate more certainly, thereby achieving the object of the heat press compression processing.

In addition, in the manufacturing method of the wet-type segmented friction material of the invention, the thickness of the peripheral portion of the friction material substrate that is pressed and compressed by the heat press compression processing may be within the range of about 20 to 95% of the thickness of the friction material substrate of the finished product.

If the thickness of the compressed peripheral portion of the friction material substrate after compression is more than about 95% compared with the thickness of the friction material substrate of the finished product, the improvement of the strength by the compression is poor. If the thickness of the compressed peripheral portion of the friction material substrate after compression is less than about 20% compared with the thickness of the friction material substrate of the finished product or in case of high compression, the compression failure is caused on the structure of the friction material substrate, thereby deteriorating the strength on the other hand. Accordingly, if thickness of the compressed peripheral portion of the friction material substrate after compression is made within the range of about 20 to 95% of the thickness of the friction material substrate of the finished product, the improvement of the strength by the compression is obtained, thereby achieving the object of the heat press compression processing.

In addition, in the manufacturing method of the wet-type segmented friction material of the invention, the thickness of the peripheral portion of the friction material substrate after it is pressed and compressed by the heat press compression processing may be substantially the same as the thickness of the other portion than the compressed peripheral portion of the friction material substrate of the finished product.

That is, the thickness of the compressed peripheral portion of the friction material substrate after compression becomes about 100% compared with the thickness of the friction material substrate of the finished product, and such thickness goes beyond the range mentioned above. Still, the pressure in the pressing work on the entire surface of the friction material substrate for obtaining the finished product can be made higher than a normal pressure so as to compress the other portion of the friction material substrate than the compressed peripheral portion to the thickness equal to the thickness of the cut portion that was processed by the heat press compression forming. In this case, the thickness of the compressed portion of the friction material substrate after compression can be made substantially equal to the thickness of the other portion of the friction, material substrate of the finished product without affecting the advantageous effects in the improvement of the strength at the cut surface. Thus, such manufacturing method can provide the wet-type segmented friction material more excellent in the friction characteristic.

In addition, in the manufacturing method of the wet-type segmented friction material of the invention, the width of the compressed peripheral portion of the friction material substrate after processed by the heat press compression processing may be within the range of about 0.1 mm to 2.0 mm at the time of cutting into the segment shape.

If the width of the compressed peripheral portion is more than about 2.0 mm in the segment piece of a normal size, there may happen some troubles that the area used for friction lessens thereby to generate lack of transmission power or the like. On the other hand, if the width of the compressed peripheral portion is less than about 0.1 mm, the advantageous effects in the improvement of the strength at the cut surface cannot be expected sufficiently. Therefore, if the width of the compressed peripheral portion of the friction material substrate is made within the range of about 0.1 mm to 2.0 mm at the time of cutting into the segment shape, the advantageous effects in the improvement of the strength at the cut surface is obtained. Moreover, the area used for friction becomes sufficient. Consequently, such manufacturing method can provide the wet-type segmented friction material excellent in the friction characteristic.

In the wet-type segmented friction material of the invention, a peripheral portion is pressed and compressed at two straight sides or at all four sides of the cut portion of the friction material substrate at the time of cutting into the segment shape.

Therefore, the fuzz at the cut surface is kept from generating and the strength is free from weakening. Consequently, the layer exfoliation of the friction material substrate is prevented from generating from the cut surface. Thus, the fuzz is restrained and the strength is improved at the cut surface so as to solve the problem due to increase of the drag torque and generation of layer exfoliation from the cut surface. Thus, it is possible to provide the inventive wet-type segmented friction material that performs excellent friction property.

Fifth Embodiment

Figure 16:
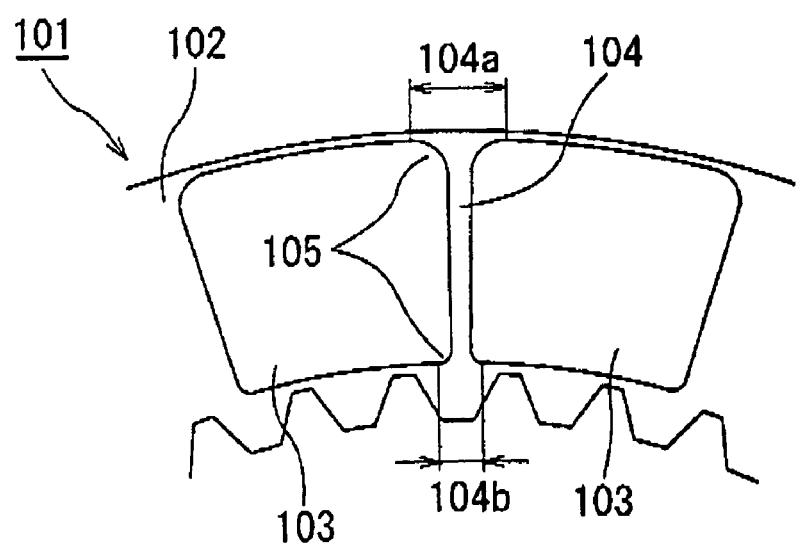
FIG. 16 is a partially enlarged plan view showing a wet-type segmented friction material having segment pieces each having four round corners of specified radii according to a fifth embodiment of the invention.

A fifth embodiment of a segmented friction material of the invention is described referring to FIG. 16. FIG. 16 is a partially enlarged plan view showing a wet-type segmented friction material having segment pieces each having four round corners of specified radii according to a fifth embodiment of the invention.

As shown in FIG. 16, the fifth embodiment of the segmented friction material 101 has a core metal 102 of a flat ring shape and segment pieces 103. The segment pieces 103 are arranged side by side with a gap or an oil groove 104 on a front surface of the core metal 102 and joined by an adhesive or a thermosetting resin thereto. The segment pieces 103 are joined by the adhesive to a rear surface of the core metal 102 in the same manner. Four corners of each of the segment pieces 103 are made into round shapes 105, respectively. Then, in the fifth embodiment, the segment pieces 103 were pressed from opposite sides of the core metal 102 for 30 to 90 seconds by a heat press of a heating temperature of about 230 to 250° C., thereby being secured to the core metal 102. Thus, a finished product of a segmented friction material 101 was obtained.

Three kinds of such segmented friction materials 101 were manufactured while changing a size of a round shape 105 at an outer peripheral corner and a round shape 105 at an inner peripheral corner so as to change a proportion between an outer peripheral opening width 104a and an inner peripheral opening width 104b. A first kind of the segmented friction material has an outer round shape 105 of R(radius)=3 and an inner round shape 105 of R=1 so as to make the proportion 104a/104b=2.1 between an outer peripheral opening width 104a and an inner peripheral opening width 104b. A second kind of the segmented friction material has an outer round shape 105 of R=2 and an inner round shape 105 of R=1 so as to make the proportion 104a/104b=1.6 between an outer peripheral opening width 104a and an inner peripheral opening width 104b. A third kind of the segmented friction material as a comparison example has an outer round shape 105 and an inner round shape 105 both of R=1 so as to make the proportion 104a/104b=1.0 between an outer peripheral opening width 104a and an inner peripheral opening width 104b.

An anti-exfoliation characteristic of the fifth embodiment of the segmented friction material will be described later together with other embodiments.

Sixth Embodiment

Figure 17:
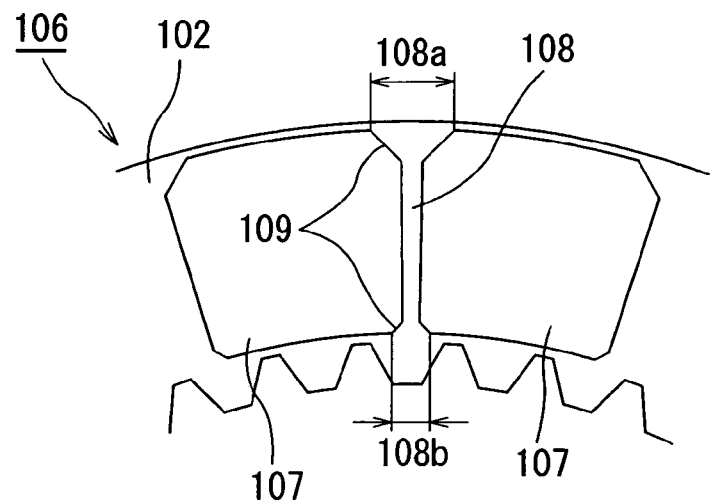
FIG. 17 is a partially enlarged plan view showing a wet-type segmented friction material having segment pieces each having four chamfered corners of specified cur-off area according to a sixth embodiment of the invention.

A sixth embodiment of a segmented friction material of the invention is described referring to FIG. 17. FIG. 17 is a partially enlarged plan view showing a wet-type segmented friction material having segment pieces each having four chamfered corners of specified cut-off area according to a sixth embodiment of the invention.

As shown in FIG. 17, the sixth embodiment of the segmented friction material 106 has a core metal 162 of a flat ring shape and segment pieces 107. The segment pieces 107 are arranged side by side with a gap or an oil groove 108 on a front surface of the core metal 102 and joined by an adhesive or a thermosetting resin thereto. The segment pieces 107 are joined by the adhesive to a rear surface of the core metal 102 in the same manner. Four corners of each of the segment pieces 107 are formed into chamfered shapes 109, respectively. Then, in the sixth embodiment, the segment pieces 107 were pressed from opposite sides of the core metal 102 for 30 to 90 seconds by a heat press of a heating temperature of about 230 to 250° C. thereby being secured to the core metal 102. Thus, a finished product of a segmented friction material 106 was obtained.

Three kinds of such segmented friction materials 106 were manufactured while changing a size of a chamfered shape 109 at an outer peripheral corner and a chamfered shape 109 at an inner peripheral corner so as to change a proportion between an outer peripheral opening width 108a and an inner peripheral opening width 108b. A first kind of the segmented friction material has an outer chamfered shape 109 of C(chamfering radius)=3 and an inner chamfered shape 109 of C=1 so as to make the proportion 108a/108b=2.1 between an outer peripheral opening width 108a and an inner peripheral opening width 108b. A second kind of the segmented friction material has an outer chamfered shape 109 of C=2 and an inner chamfered shape 109 of C=1 so as to make the proportion 108a/108b=1.6 between an outer peripheral opening width 108a and an inner peripheral opening width 108b. A third kind of the segmented friction material as a comparison example has an outer chamfered shape 109 and an inner chamfered shape both of R=1 so as to make the proportion 108a/108b=1.0 between an outer peripheral opening width 108a and an inner peripheral opening width 108b.

Seventh Embodiment

Figure 18:
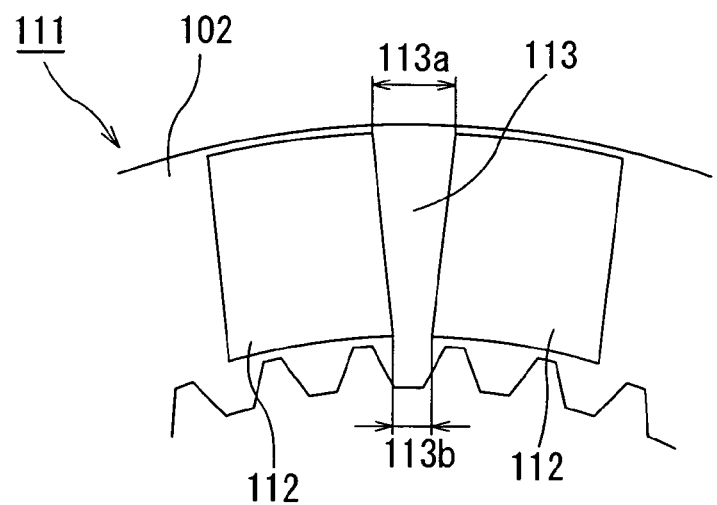
FIG. 18 is a partially enlarged plan view showing a wet-type segmented friction material having segment pieces arranged with substantially a V-shaped gap provided therebetween according to a seventh embodiment of the invention.

A seventh embodiment of a segmented friction material of the invention is described referring to FIG. 18. FIG. 18 is a partially enlarged plan view showing a wet-type segmented friction material having segment pieces arranged with substantially a V-shaped gap provided therebetween according to a seventh embodiment of the invention.

As shown in FIG. 18, the seventh embodiment of the segmented friction material 111 has a core metal 102 of a flat ring shape and segment pieces 112. The segment pieces 112 are arranged side by side with a gap or an oil groove 113 on a front surface of the core metal 102 and joined by an adhesive or a thermosetting resin thereto. The segment pieces 112 are joined by the adhesive to a rear surface of the core metal 102 in the same manner. A gap between adjacent segment pieces 112 is formed into substantially a V-shape. Then, in the seventh embodiment, the segment pieces 112 were pressed from opposite sides of the core metal 102 for 30 to 90 seconds by a heat press of a heating temperature of about 230 to 250° C. thereby being secured to the core metal 102. Thus, a finished product of a segmented friction material 111 was obtained.

Three kinds of such segmented friction materials 111 were manufactured while changing an angle of an oil groove 113 of the above-mentioned V-shape so as to change a proportion between an outer peripheral opening width 113a and an inner peripheral opening width 113b. A first kind of the segmented friction material has an outer peripheral groove width 113a=6 and an inner peripheral groove width 113b=2 so as to make the proportion 113a/113b=3.0 between the outer peripheral groove width 113a and the inner peripheral groove width 113b. A second kind of the segmented friction material has an outer peripheral groove width 113a=4 and an inner peripheral groove width 113b=2 so as to make the proportion 113a/113b=2.0 between the outer peripheral groove width 113a and the inner peripheral groove width 113b. A third kind of the segmented friction material has an outer peripheral groove width 113a=2.5 and an inner peripheral groove width 113b=2 so as to make the proportion 113a/113b≈1.3 between the outer peripheral groove width 113a and the inner peripheral groove width 113b.

Evaluation and Test Results

Figure 19:
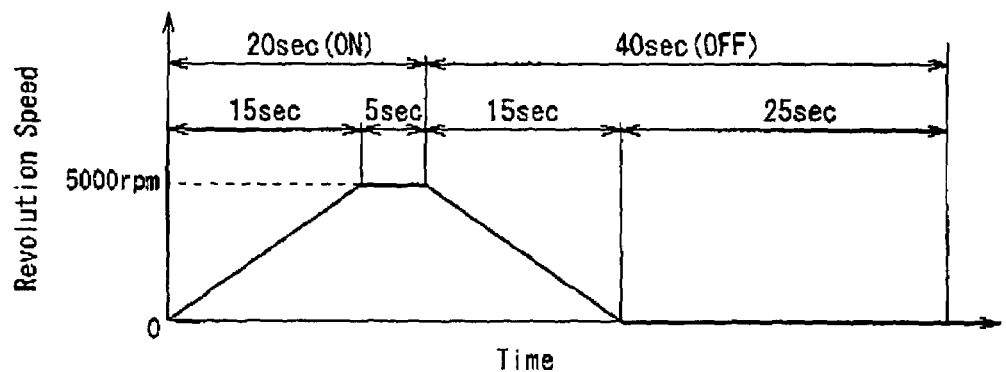
FIG. 19 is a graph showing a relation between a rotation and a time in an anti-exfoliation test of the wet-type segmented friction material according to the fifth to seventh embodiments of the invention.
Figure 20:
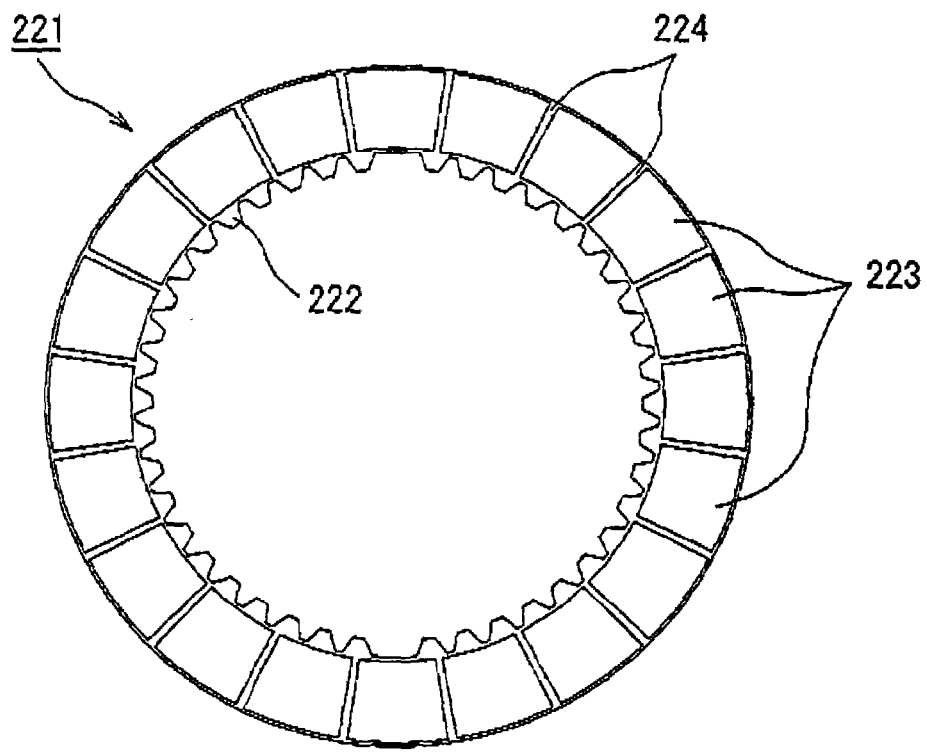
FIG. 20 illustrates a plan view of an overall structure of a conventional segmented friction material.

An anti-exfoliation characteristic test was conducted on the nine kinds of the segmented friction materials described in the fifth to seventh embodiments. Details and results of the test are described hereafter referring to FIG. 19. FIG. 19 is a graph showing a relation between a rotation and a time in an anti-exfoliation test of the wet-type segmented friction material according to the fifth to seventh embodiments of the invention.

A SAE#2 tester 20 was used as a tester, as in the first to the fourth embodiments. Three segmented friction materials S as a test specimen were disposed between four plates, respectively. The anti-exfoliation evaluation test was conducted while letting ATF of an oil temperature of 120° C. flow as a lubricating oil through the lubricating oil holes in a lubricating oil amount of 1000 ml or full dip state. An anti-exfoliation test was conducted also under a condition that a proportion between an ON state and an OFF state became ON/OFF=20sec/40sec per one cycle at a relative revolution speed of 5000 rpm, as shown in FIG. 19. In ON state, the four plates and the three segmented friction materials were pressed to each other. In OFF state, the four plates and the three segmented friction materials were separated from each other with a clearance. Under such conditions, a number of durability cycles was measured until an exfoliation was generated on the segment piece. Test results of each of the embodiments are shown in TABLE 2, TABLE 3 and TABLE 4.

TABLE 2

| (Fifth Embodiment) | | | |
|---|---|---|---|
| Outer Radius R | 3 | 2 | 1 |
| Inner Radius R | 1 | 1 | 1 |
| 104a/104b | 2.1 | 1.6 | 1.0 |
| Durability Cycle | 2500 | 500 | 10 |

TABLE 3

| (Sixth Embodiment) | | | |
|---|---|---|---|
| Outer Radius C | 3 | 2 | 1 |
| Inner Radius C | 1 | 1 | 1 |
| 108a/108b | 2.1 | 1.6 | 1.0 |
| Durability Cycle | 2500 | 500 | 10 |

TABLE 4

| (Seventh Embodiment) | | | |
|---|---|---|---|
| Outer Width | 6 | 4 | 2.5 |
| Inner Width | 2 | 2 | 2 |
| 113a/113b | 3.0 | 2.0 | 1.3 |
| Durability Cycle | 5000 | 2500 | 10 |

TABLE 2 shows the test results of the fifth embodiment in which the four corners of the segment piece 103 are formed with the round shapes. TABLE 3 shows the test results of the sixth embodiment in which the four corners of the segment piece 107 are formed with the chamfered shapes. As shown in TABLE 2 and TABLE 3, in the comparison example or the third kind of the segmented friction material, the outer peripheral opening width 104a, 108a and the inner peripheral opening width 104b, 108b have the same size, i.e. 104a/104b=1.0 or 108a/108b=1.0. In these cases, the number of the durability cycle is just 10 cycles, so that an exfoliation is generated in a very short time.

In contrast, in the second kind of the segmented friction material in which the outer peripheral opening width 104a, 108a is 1.6 times as large as the inner peripheral opening width 104b, 108b, the number of the durability cycle is 500 cycles. That is, the anti-exfoliation characteristic is improved remarkably in the second segmented friction materials of both of the fifth and the sixth embodiments. Moreover, in the first kind of the segmented friction material in which the outer peripheral opening width 104a, 108a is 2.1 times as large as the inner peripheral opening width 104b, 108b, the number of the durability cycle is 2500 cycles. That is, the anti-exfoliation characteristic is improved more remarkably in the first segmented friction materials of both of the fifth and the sixth embodiments.

On the other hand, TABLE 4 shows the test results of the seventh embodiment in which the gap between the adjacent segment pieces 112 is substantially the V-shape. In case of the segmented friction material in which the outer peripheral opening width 113a is about 1.3 times as large as the inner peripheral opening width 113b, the number of the durability cycle is just 10 cycles, so that the anti-exfoliation characteristic is not improved. Thus, even if the outer peripheral opening width 113a is larger than the inner peripheral opening width 113b, the anti-exfoliation characteristic may not be improved depending on the shape of the segment piece or the shape of the oil groove according to the shape of the segment piece. Though it is not confirmed since there are no experimental data, if 113a/113b equals to 1.6 or the outer peripheral opening width 113a is 1.5 or more times as large as the inner peripheral opening width 113b, the anti-exfoliation characteristic is possibly improved.

In contrast, in case of the segmented friction material in which the outer peripheral opening width 113a is about 2.0 times as large as the inner peripheral opening width 113b, the number of the durability cycle is 2500 cycles, so that the anti-exfoliation characteristic is remarkably improved. Moreover, in case of the segmented friction material in which the outer peripheral opening width 113a is about 3.0 times as large as the inner peripheral opening width 113b, the number of the durability cycle is 5000 cycles, so that the anti-exfoliation characteristic is improved more remarkably.

Consequently, as judged from the test results shown in TABLE 2, TABLE 3 and TABLE 4, it is thought to be most preferable in order to improve the anti-exfoliation characteristic that the outer peripheral opening width 104a, 108a, 113a is within the range of about 2.0 to 3.0 times as large as the inner peripheral opening width 104b, 108b, 113b.

Each of the fifth to the seventh embodiments was described as an example in which the segmented friction material was used in an automatic transmission of an automobile. Instead, the segmented friction material may be used for a friction material clutch device in which single or plural friction plates are provided that is applicable to a automatic transmission of a motorcycle or the like. Accordingly, the size changes in the entire segmented friction material or each part of the segmented friction material depending on its use.

The invention is not limited to the above fifth to seventh embodiments with respect to the other structure, shape, number, material, size, connection or the like of the wet-type segmented friction material as well as to the other steps of the manufacturing method of the wet-type segmented friction material.

Advantageous Effects

Advantageous effects of the invention that is concretized into the fifth to the seventh embodiments are described hereunder.

In the segmented friction material of the invention, the outer peripheral opening width is made larger than the inner peripheral opening width in the gap as the oil groove between the adjacent segment pieces.

If the outer peripheral opening width is made larger than the inner peripheral opening width, the ATF flows smoothly at the outer peripheral opening. Consequently, the oil pressure generated at the outer peripheral portion is restrained, so that the segment piece becomes remarkably hard to be exfoliated.

Thus, the oil pressure generated at the outer peripheral portion is restrained, so that the segmented friction material can improve the anti-exfoliation characteristic very much.

In addition, in the segmented friction material of the invention, the outer peripheral opening width may be about 1.5 times or more as large as the inner peripheral opening width in the gap as the oil groove between the adjacent segment pieces.

Even if the outer peripheral opening width larger than the inner peripheral opening width, the effects of restraining the oil pressure generated at the outer peripheral portion may not be expected depending on the shape of the segment piece or the like. Therefore, the inventors devoted themselves to experiments many times. Then, the inventors found out that, if the outer peripheral opening width is about 1.5 times or more as large as the inner peripheral opening width, the effects of restraining the oil pressure generated at the outer peripheral portion are surely expected and that the segment piece is hard to be exfoliated.

Thus, the oil pressure generated at the outer peripheral portion is surely restrained, so that the segmented friction material can improve the anti-exfoliation characteristic very much.

In addition, in the segmented friction material of the invention, the outer peripheral opening width may be about 2.0 to about 3.0 times as large as the inner peripheral opening width in the gap as the oil groove between the adjacent segment pieces.

In this case, the oil pressure generated at the outer peripheral portion of the segment piece is restrained and the segment piece is harder to be exfoliated. If the area of the segment piece is lessened too much, the friction area decreases and there may occur some troubles. Still, if the outer peripheral opening width is about 2.0 to about 3.0 times as large as the inner peripheral opening width, it is possible to restrain the oil pressure generated at the outer peripheral portion most appropriately.

Thus, the oil pressure generated at the outer peripheral portion is more surely restrained, so that the segmented friction material can improve the anti-exfoliation characteristic very much.

In addition, in the segmented friction material of the invention, each of the segment pieces may have the round shape at each of the four corners.

In this case, if two of the four corners of the segment piece, which are located at an outer periphery thereof, have the round shape of the radius larger than the radius of the other two of the four corners, the outer peripheral opening width becomes larger than the inner peripheral opening width. Consequently, the ATF can flow smoothly at the outer peripheral opening, thereby restraining the oil pressure generated at the outer periphery. As a result, the segment piece is very hard to be peeled off.

Thus, the oil pressure generated at the outer peripheral portion is restrained, so that the segmented friction material can improve the anti-exfoliation characteristic very much.

In addition, in the segmented friction material of the invention, each of the segment pieces may have the chamfered shape at each of the four corners.

In this case, if two of the four corners of the segment piece, which are located at the outer periphery thereof, have the chamfered shape larger than the other two of the four corners, the outer peripheral opening width becomes larger than the inner peripheral opening width. Consequently, the ATF can flow smoothly at the outer peripheral opening, thereby restraining the oil pressure generated at the outer periphery. As a result, the segment piece is very hard to be peeled off.

Thus, the oil pressure generated at the outer peripheral portion is restrained, so that the segmented friction material can improve the anti-exfoliation characteristic very much.

In addition, in the segmented friction material of the invention, the gap to be the oil groove between the adjacent two segment pieces may have substantially the V-shape.

In this case, if the larger side of the V-shape is located at the outer peripheral opening, the outer peripheral opening width becomes larger than the inner peripheral opening width. Consequently, the ATF can flow smoothly at the outer peripheral opening, thereby restraining the oil pressure generated at the outer periphery. As a result, the segment piece is very hard to be peeled off.

Thus, the oil pressure generated at the outer peripheral portion is restrained, so that the segmented friction material can improve the anti-exfoliation characteristic very much.

The preferred embodiments described herein are illustrative and not restrictive, the scope of the invention being indicated in the appended claims and all variations which come within the meaning of the claims are intended to be embraced therein.

The invention claimed is:

1. A wet-type segmented friction material comprising:
   a core metal of a flat ring shape; and
   a friction material substrate cut into a segment shape along the flat ring shape of the core metal, thereby preparing segment pieces each having the segment shape, the segment pieces being joined by adhesion on one or both surfaces of the core metal along the flat ring shape, an area around a cut portion corresponding to the segment shape of the friction material substrate being pressed and heat-compressed at two opposite end parts as two straight lines of the cut portion when the friction material substrate is cut into the segment shape before being joined on the core metal, so that the area around the cut portion of each of the segment pieces defines a heat-compressed portion wherein components thereof are joined with each other by heating and compressing,
   each of said pressed and heat-compressed areas formed at the two opposite end parts of the friction material substrate being formed into a band-shaped depressed flat area extending along a side edge of an unpressed area defined between said two pressed and heat-compressed areas of the friction material substrate with an even thickness in its entirety that is smaller than a thickness of said unpressed area, each of said pressed and heat-compressed areas having a material density higher than a material density of the unpressed area.

2. A wet-type segmented friction material comprising:
   a core metal of a flat ring shape; and
   a friction material substrate cut into a segment shape along the flat ring shape of the core metal, thereby preparing segment pieces each having the segment shape, the segment pieces being joined by adhesion on one or both surfaces of the core metal along the flat ring shape, a gap as an oil groove being formed between adjacent segment pieces joined on the surface of the core metal, a width at an outer peripheral opening of the gap being larger than a width at an inner peripheral opening of the gap;
   wherein each of the segment pieces has substantially a reversed trapezoidal shape with four corners rounded or chamfered so that the oil groove is composed of an inner part, a center part and an outer part aligned in a radial direction of the core metal, the center part being defined between adjacent straight side lines of the adjacent segment pieces while the straight side lines extend parallel to each other, the inner part being defined between adjacent inner rounded or chamfered corners of the adjacent segment pieces so as to constitute the inner peripheral opening of the gap and the outer part being defined between adjacent outer rounded or chamfered corners of the adjacent segment pieces so as to constitute the outer peripheral opening of the gap.

3. A wet-type segmented friction material according to claim 2, in which the width at the outer peripheral opening of the gap is about one and a half times as large as the width at the inner peripheral opening of the gap.

4. A wet-type segmented friction material according to claim 2, in which the width at the outer peripheral opening of the gap is about twice to about three times as large as the width at the inner peripheral opening of the gap.

5. A wet-type segmented friction material according to claim 2, in which the segment piece has a round shape formed at each of the four corners.

6. A wet-type segmented friction material according to claim 2, in which the segment piece has a chamfered shape formed at each of the four corners.

7. A wet-type segmented friction material comprising:
   a core metal of a flat ring shape; and
   a friction material substrate cut into a segment shape along the flat ring shape of the core metal, thereby preparing segment pieces each having the segment shape, the segment pieces being joined by adhesion on one or both surfaces of the core metal along the flat ring shape,
   wherein two opposite end parts of said friction material substrate are pressed at two sides of two parallel lines defining a separation between a pressed and an impressed area,
   each of said two pressed areas provided on said two opposite end parts of the friction material substrate being formed into a band-shaped depressed flat area extending along a side edge of said unpressed area defined between said two pressed areas of the friction material substrate with an even thickness in its entirety that is smaller than a thickness of said unpressed area, each of said pressed areas having a material density higher than a material density of the unpressed area.

8. A wet-type segmented friction material comprising:
   a core metal of a flat ring shape; and
   a friction material substrate cut into a segment shape along the flat ring shape of the core metal, thereby preparing segment pieces each having the segment shape, the segment pieces being joined by adhesion on one or both surfaces of the core metal along the flat ring shape,
   wherein all four peripheral edges of said friction material substrate cut into the segment shape are pressed,
   each of said four pressed areas provided on said four peripheral edges of the friction material substrate being formed into a band-shaped depressed flat area extending alone a side edge or a peripheral edge of said unpressed area defined between said four pressed areas of the friction material substrate with an even thickness in its entirety that is smaller than a thickness of said unpressed area, each of said pressed areas having a material density higher than a material density of the unpressed area.

9. A wet-type segmented friction material comprising:
   a core metal of a flat ring shape; and
   a friction material substrate cut into a segment shape along the flat ring shape of the core metal, thereby preparing segment pieces each having the segment shape, the segment pieces being joined by adhesion on one or both surfaces of the core metal along the flat ring shape, a gap as an oil groove being formed between adjacent segment pieces joined on the surface of the core metal, a width at an outer peripheral opening of the gap being larger than a width at an inner peripheral opening of the gap;

wherein each of the segment pieces is of a shape having a pair of curved opposite sides extending in a circumferential direction of the core metal and a pair of parallel linear opposite sides extending in a radial direction of the core metal, the segment pieces are arranged at an interval of the gap while disposing the curved opposite sides along the circumferential direction of the core metal and the linear opposite sides along the radial direction of the core metal so that the oil groove has a V-shape aligned in the radial direction of the core metal.

* * * * *